United States Patent
Domagala et al.

(10) Patent No.: US 7,424,651 B2
(45) Date of Patent: Sep. 9, 2008

(54) METHOD AND APPARATUS FOR DECISION THRESHOLD CONTROL IN AN OPTICAL SIGNAL RECEIVER

(75) Inventors: Jerzy Domagala, Red Bank, NJ (US); Yi Cai, Eatontown, NJ (US); Franklin Webb Kerfoot, III, Red Bank, NJ (US); Greg Valvo, Wall, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 344 days.

(21) Appl. No.: 11/018,072

(22) Filed: Dec. 21, 2004

(65) Prior Publication Data

US 2006/0136798 A1    Jun. 22, 2006

(51) Int. Cl.
*G06F 11/00* (2006.01)
*H03M 13/00* (2006.01)

(52) U.S. Cl. .................. 714/709; 714/704; 714/705; 714/706; 714/708

(58) Field of Classification Search ......... 714/704–706, 714/708, 709
See application file for complete search history.

(56) References Cited

U.S. PATENT DOCUMENTS

| | | | |
|---|---|---|---|
| 6,715,113 B1 * | 3/2004 | Bendak et al. | 714/708 |
| 6,871,304 B2 * | 3/2005 | Hadjihassan et al. | 714/704 |
| 6,918,069 B2 * | 7/2005 | Grandi et al. | 714/704 |
| 7,055,084 B2 * | 5/2006 | Bock et al. | 714/774 |
| 2006/0008279 A1 * | 1/2006 | Chiang et al. | 398/202 |

FOREIGN PATENT DOCUMENTS

| | | |
|---|---|---|
| EP | 1324555 | 7/2003 |
| GB | 2371187 | 7/2002 |
| WO | 03013030 | 2/2003 |

OTHER PUBLICATIONS

European Search report issued in Application No. 05255359.1 dated Dec. 27, 2007 (7 pages).

* cited by examiner

*Primary Examiner*—Joseph D Torres
(74) *Attorney, Agent, or Firm*—Grossman Tucker Perreault & Pfleger, PLLC

(57) ABSTRACT

An apparatus and method for decision threshold control in an optical signal receiver. A forward error correction (FEC) decoder provides a feedback signal representative of corrected errors. The decision threshold is adjusted to balance a number of corrected ones and zeros.

14 Claims, 3 Drawing Sheets

METHOD AND APPARATUS FOR DECISION THRESHOLD CONTROL IN AN OPTICAL SIGNAL RECEIVER

TECHNICAL FIELD

The present application relates to optical transmission of information and, more particularly, to a method and apparatus for decision threshold control in an optical signal receiver.

BACKGROUND

Reliable optical communication systems require mechanisms for minimizing the effects of signal degradation occurring between associated transmitters and receivers. Signal degradation occurs due to a variety of factors that cannot be completely eliminated, and is exacerbated by the long-haul transmission distances and high optical channel counts required in many applications. Due to signal degradation, some transmitted data may be incorrectly interpreted at a receiver. If data is misinterpreted at a rate above that which is acceptable, the efficacy and viability of the system may be lost.

A variety of techniques for minimizing the effects of signal degradation have been investigated. Forward Error Correction (FEC) is one technique used to help compensate for signal degradation and provide "margin improvements" to the system. Margin improvements generally allow an increase in amplifier spacing and/or increase in system capacity. In a Wavelength Division Multiplexing (WDM) system, for example, margin improvements obtained through FEC techniques allow an increase in the bit rate of each WDM channel and/or a decrease the spacing between WDM channels. This translates directly into an increased system data capacity.

FEC typically involves insertion of a suitable error correction code into a transmitted data stream to facilitate detection and correction of data errors about which there is no previously known information. Error correction codes are generated in an FEC encoder for the data stream, and are sent to a receiver including an FEC decoder. The FEC decoder recovers the error correction codes and uses them to correct any errors in the received data stream.

Of course, the efficacy of FEC techniques is impacted by the ability of the optical signal receiver to correctly detect transmitted data and error correction codes. Improvements in receiver signal detection thus translate to improved performance of FEC codes in providing correction of bit errors. A known receiver configuration includes a decision circuit for converting the received data signal into a binary electrical signal, e.g. including logic ones and zeros representative of the transmitted data. The decision circuit may, for example, include a comparator for comparing the received data signal with a predetermined voltage level (the decision threshold). If the voltage level of the received data signal is above the decision threshold at a particular sample time, the comparator may output a logic one. If, however, the voltage level of the received data signal is below the decision threshold, the comparator may output a logic zero.

The decision circuit thus makes an initial decision as to the data bit values of the received data stream. The FEC decoder detects and corrects errors in the data stream established by the decision circuit. Certainly, therefore, optimal setting of the decision threshold in the decision circuit is important in achieving optimal system bit error rate (BER).

In a known configuration an optimal decision threshold is established by minimizing the total number of corrected errors reported by the FEC decoder. The total number of corrected errors is provided as feedback to a decision threshold control circuit which causes adjustment of the decision threshold to minimize the total number of corrected errors. A difficulty associated with this approach it that the direction of correction for the decision threshold is typically unknown. As such, the initial decision threshold correction may be implemented in an incorrect direction, resulting in an increase in the total number of corrected errors. The increase in errors may be corrected by the feedback loop in the next sample period, but is nonetheless inefficient.

Accordingly, there is a need for a method and apparatus for decision threshold control in an optical signal receiver, which is capable of efficiently controlling a decision threshold.

BRIEF DESCRIPTION OF THE DRAWINGS

These and other features and advantages of the present invention will be better understood by reading the following detailed description, taken together with the drawings wherein.

DETAILED DESCRIPTION

Figure 1:
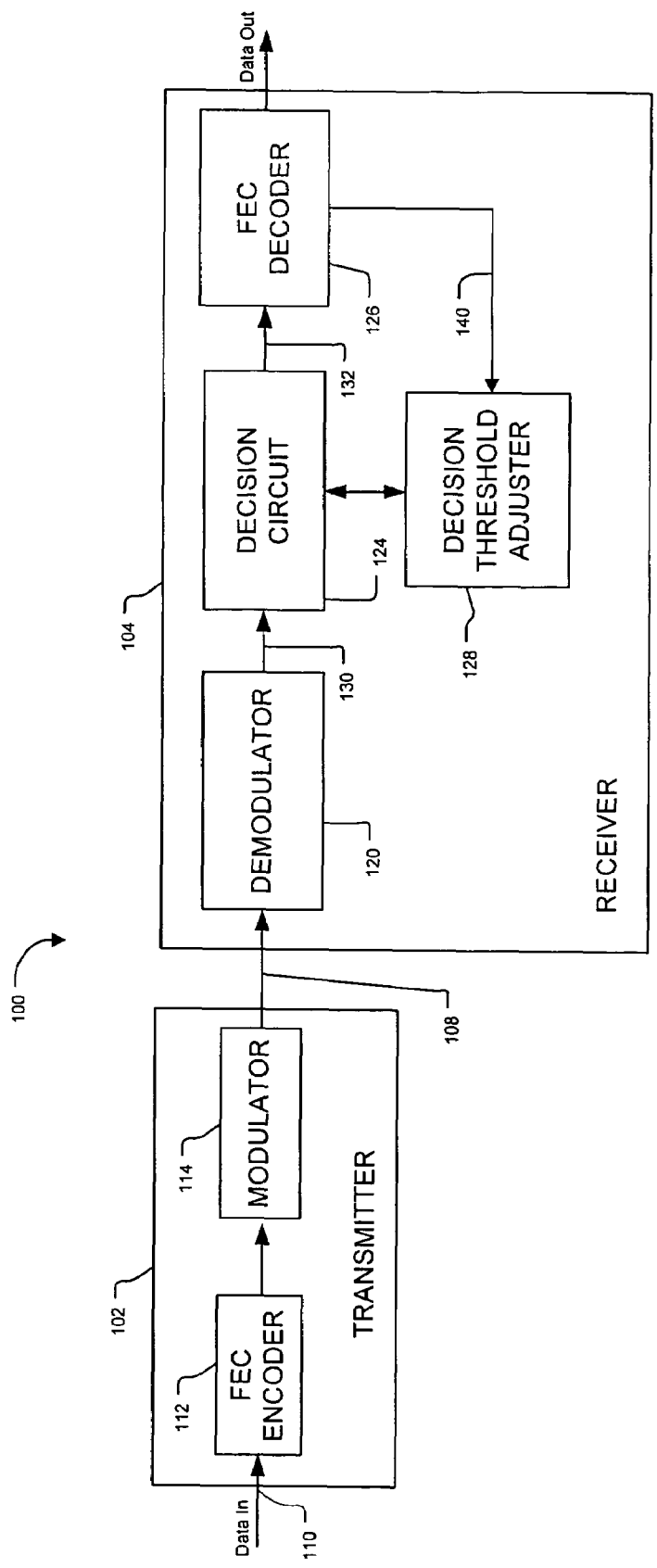
FIG. 1 is a schematic block diagram of an optical communication system including decision threshold adjustment consistent with one embodiment of the present invention.

FIG. 1 shows an optical communication system 100 including an apparatus and method for decision threshold adjustment consistent with one embodiment of the present invention. The system is capable of optimizing a decision threshold by balancing the number of binary ones ("1"s) corrected by an FEC decoder with the number of zeros ("0"s) corrected by the FEC decoder. Although exemplary embodiments are described in the context of an optical system, and are useful in connection with a long-haul WDM optical system, the broad concepts discussed herein may be implemented in other communication systems transmitting and receiving other types of signals.

The optical communication system 100 may include a transmitter 102 for transmitting an encoded optical signal 108 and a receiver 104 for receiving the encoded optical signal 108. Those of ordinary skill in the art will recognize that the depicted system is highly-simplified for ease of explanation. For example, the transmitter 102 and the receiver 104 may be configured as one or more transceivers capable of performing both transmitting and receiving functions. The illustrated embodiments herein are provided only by way of explanation, not of limitation.

The transmitter 102 may include an FEC encoder 112 that encodes a data stream 110 with an error correction code and a modulator 114 that modulates an optical signal with the encoded data stream. The data stream 110 may be a binary data stream including a series of bits. Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, and some newer codes such as the Turbo convolutional and product codes (TCC, TPC).

Hardware and software configurations for implementing various error correcting codes in the encoder 112 and a corresponding decoder are known to those ordinary skill in the art.

The modulator 114 may be implemented using optical modulation techniques and equipment known to those skilled in the art. The modulator 114 may modulate encoded data on an optical wavelength, e.g. from a continuous-wave laser source, using any modulation format known in the art, including, but not limited to, On-Off-Keying (OOK), Phase Shift Keying (PSK), and Differential Phase-Shift-Keying (DPSK) formats. These formats may be implemented in one or more known variations including, but not limited to, Return-to-Zero (RZ), Non-Return to Zero (NRZ) and Chirped-Return-to-Zero (CRZ) variations. For example, DPSK formats, such as RZ-DPSK, have proven advantageous in connection with long-haul optical communication systems.

The receiver 104 may include a demodulator 120, a decision circuit 124, a FEC decoder 126, and a decision threshold adjuster 128. The demodulator 120 demodulates the encoded optical signal 108 to provide a demodulated signal 130, and may be implemented using techniques and equipment known to those skilled in the art. The decision circuit 124 receives the demodulated signal 130 as an input signal. The decision circuit 124 quantizes the signal 130 using a decision threshold, then re-times the quantized data stream to produce an output signal 132 including a stream of data bits, i.e. logic "1"s and "0"s. The decision circuit 124 may be implemented using techniques and detection circuitry known to those skilled in the art. In one embodiment, the decision circuit may include a comparator for comparing the signal 130 with a decision threshold and quantizing it to the stream of "1's" and "0's", followed by a re-timing circuit. In another embodiment, the decision circuit may include a D-Flip Flop (D-FF) with an input allowing for decision threshold adjustment and a clock recovery circuit. In yet another embodiment, the decision circuit may include a known Clock & Data Recovery circuit (CDR) with a decision threshold adjustment input.

The FEC decoder 126 receives the detected and re-timed signal 132 and decodes the signal 132 consistent with the implemented FEC scheme. The FEC decoder 126 provides one or more feedback signals, e.g. on feedback path 140, to the decision threshold adjuster 128. The feedback provided from the FEC decoder 126 to the decision threshold adjuster 128 includes information indicating the total number of "1"s and the total number of "0"s that were corrected by the FEC decoder 126 in particular sampling period, e.g. 1 second.

The total number of errors corrected by the FEC decoder 126 in a particular sampling period may be determined by adding the total number of corrected "1"s to the total number of corrected "0"s, or may be derived separately from information in the feedback signal from the FEC decoder 126. In one embodiment, adjustment of the decision threshold may occur only if the total number of reported errors over one or more sampling periods exceeds a predetermined error threshold. This approach may prevent unnecessary adjustments of the decision threshold when the total number of errors is very low (e.g. high Q) and the statistical validity of the information from the FEC is low. In another embodiment, adjustment may be performed continuously without regard to the total number of reported errors.

The decision threshold adjuster 128 may be configured for adjusting the decision threshold in response to the feedback signal from the FEC decoder 126 to balance the number of corrected "1"s and the number of corrected "0"s. For any particular sampling period or group of sampling periods, the number of corrected "1"s may not exactly equal the number of corrected "0"s. As such, "balance" or "balancing" as used herein with reference to operation of decision threshold means to reduce the difference between the number of corrected "1"s and the number of corrected "0"s. In most systems, balancing the number of corrected "1's" and corrected "0's" reduces the total number of errors, thus improving the system performance.

Figure 2:
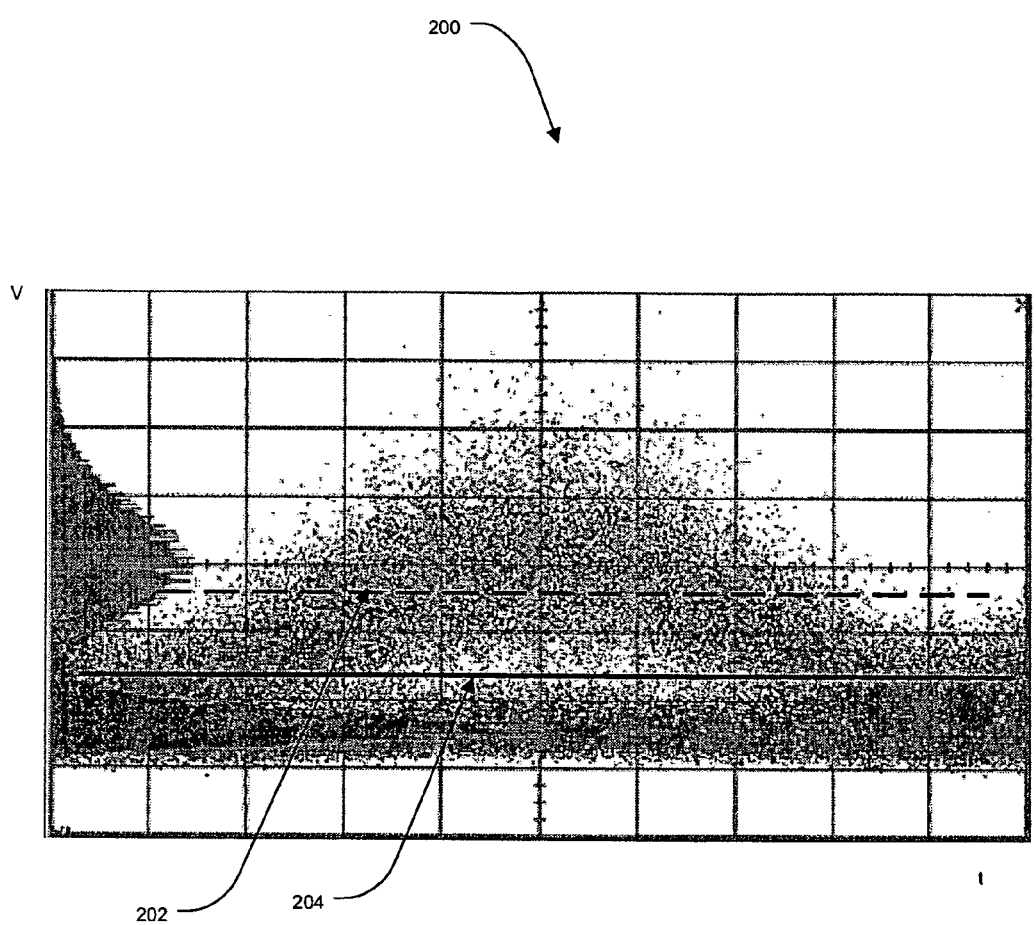
FIG. 2 is an exemplary eye diagram illustrating decision threshold adjustment in a manner consistent with the invention.

FIG. 2 is an eye diagram 200 associated with a receiver consistent with the invention. Equipment for observing an eye diagram associated with a data signal is well known and commercially available. It is well known, for example, that an eye diagram associated with data signal may be observed on an oscilloscope by monitoring the data signal voltage on the vertical input of the oscilloscope and triggering on the data clock. An eye diagram is open or closed to an extent associated with signal degradation. An open eye diagram represents less signal degradation. Conversely, a closed eye diagram represents more signal degradation.

As shown in FIG. 2, the decision threshold may be set to an initial value indicated on the eye diagram 200 by the dashed line 202. In the illustrated exemplary embodiment, the number of corrected "1"s may be greater than the number of corrected "0"s. This would indicate that the decision threshold is set too high. The decision threshold adjuster 128 may therefore decrease the decision threshold by a predetermined step to an adjusted value indicated by the solid line 204. In the succeeding sampling periods, the FEC decoder may provide feedback to the decision threshold adjuster indicating a smaller difference between the number of corrected "1"s and the number of corrected "0"s, e.g. more sampling periods may be required before the error threshold is exceeded.

Figure 3:
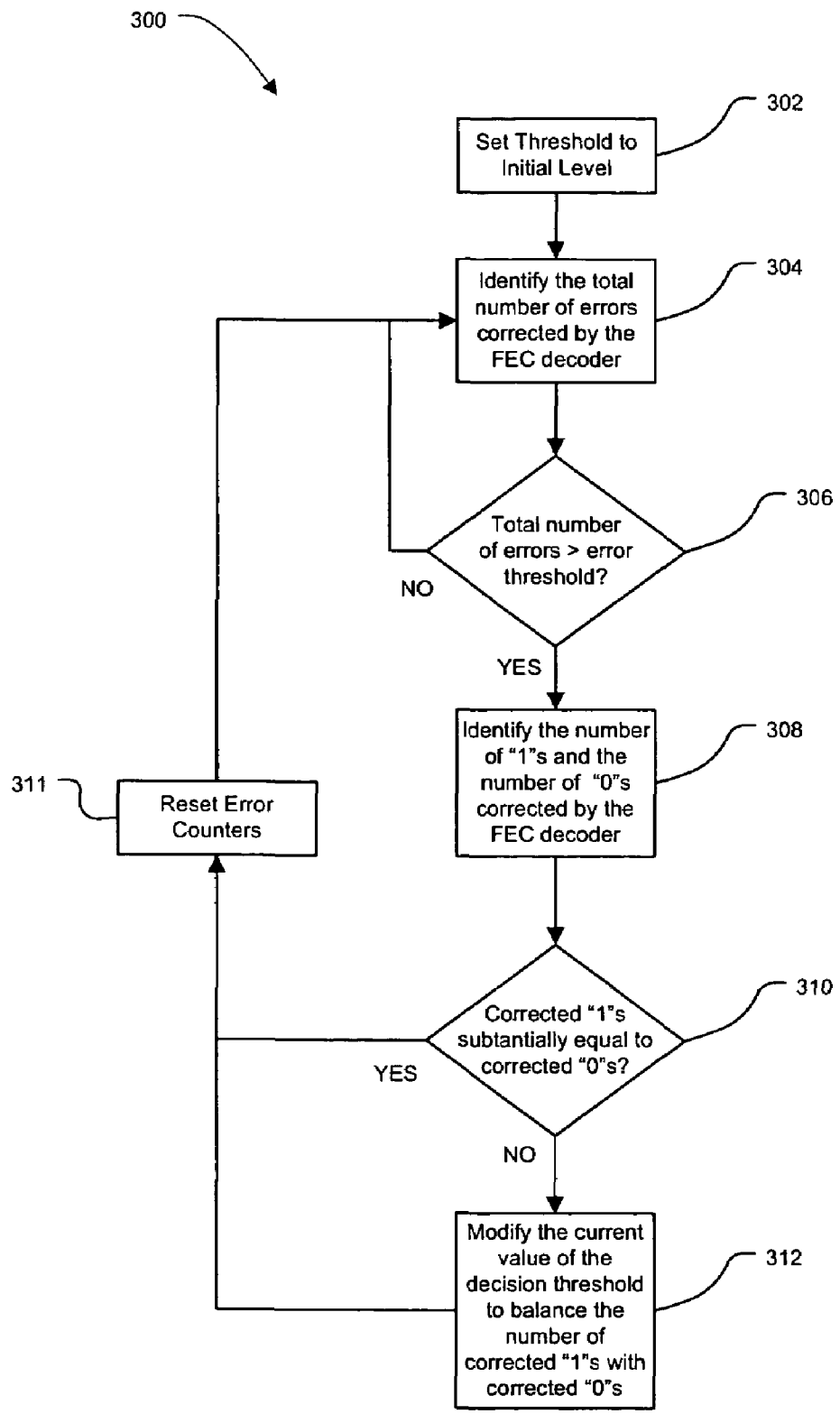
FIG. 3 is a block flow diagram illustrating an exemplary decision threshold adjustment process consistent with the present invention.

FIG. 3 is a block flow diagram of one example of a decision threshold adjustment process 300 consistent with the present invention. The block flow diagram is illustrated with a particular sequence of steps. It can be appreciated, however, that the sequence of steps merely provides an example of how the general functionality described herein can be implemented. Further, each sequence of steps does not have to be executed in the order presented unless otherwise indicated.

In the illustrated exemplary embodiment, the decision threshold may be set to an initial predetermined voltage level 302, e.g. a mid-range vale. The total number of errors corrected by the FEC decoder 126 may be identified 304 and accumulated by the decision threshold adjuster 128 until a predetermined error threshold is reached 306. Accumulating errors until the error threshold is exceeded avoids consecutive threshold corrections in high Q systems wherein the number of errors reported in a particular sampling period is too low to be statistically important. As long at the total number of errors is not greater than a predetermined error threshold, flow may pass back to step 304 to continuously accumulate the errors until the total number of errors exceeds the predetermined error threshold.

The decision threshold update rate may thus be determined by the rate of errors. For systems operating a high Q (low level of errors) numerous sampling periods may pass before a total number of errors exceeds the predetermined error threshold. However for systems operating a low Q, the error threshold may be exceeded in the first sampling period, e.g. in 1 second.

Once the total number of errors exceeds the predetermined error threshold, the number of "1"s and the number of "0"s corrected by the FEC decoder 126 may be identified 308. If the total number of corrected "1"s is equal to, or within a predetermined acceptable difference from, the total number of corrected "0"s 310, then the error counters may be reset 311 and flow may pass back to step 304. If the total number of corrected "1"s is not equal to, or within the predetermined acceptable difference from the total number of corrected "0"s, then the decision threshold may be modified 312 to balance number of corrected "1"s with the number of corrected "0"s. The error counters may then be reset 311 and flow may pass back to step 304.

In one embodiment, the decision threshold may be modified proportionally to the ratio of corrected "1"s to corrected "0"s. This allows for large adjustments of the decision threshold when the ratio of corrected "1"s to corrected "0"s is large and smaller adjustments of the decision threshold when the difference is small. For example, the ratio of a difference between the total number of corrected "1"s and the total number of corrected "0"s to the total number of errors corrected, i.e. the error balance Er_bal, may be determined by:

$$Er\_bal = (Er1 - Er0)/(Er1 + Er0).$$

The decision threshold may be adjusted by calculating an incremental step that is proportional to the magnitude of the error balance Er_bal, e.g. by multiplying a default step value by the error balance Er_bal value. If the step is within predetermined acceptable range, the decision threshold may be adjusted by the calculated step. In receivers with fixed data polarity determined by the hardware configuration (e.g. true data stream applied to the decision circuit, or inverted data stream applied to the decision circuit), the direction of the adjustment (increment or decrement) may be determined by the sign of the error balance Er_bal.

In a system wherein data is modulated using a DPSK format, the polarity of the demodulated data, i.e. true or inverted, depends on the operating point of the DPSK demodulator. The direction of the threshold adjustment depends on the polarity of the data. In one embodiment, to account for unknown demodulated data polarity, the FEC decoder 126 may continuously flip the received data polarity until it identifies and decodes a frame. The feedback from the FEC decoder 126 to the decision threshold adjuster 128 may then indicate the polarity of the data. The polarity of the data at the input to the decision circuit, in conjunction with the sign of the error balance Er_bal, may determine the direction of the decision threshold adjustment. In another embodiment, the demodulator may be configured to alternate between valid operating points until an FEC frame is detected.

There is thus provided a method and apparatus for decision threshold control in an optical signal receiver. According to one aspect, there is provided an apparatus including a decision circuit for receiving an input signal and providing an output signal representing logic ones and zeros in response to comparison of the input signal with a decision threshold; a FEC decoder configured to decode the output signal and to provide a feedback signal representative of a number of errors corrected by the FEC decoder; and a decision threshold adjuster. The decision threshold adjuster is configured to adjust the decision threshold in response to the feedback signal to balance a number of ones corrected by the FEC decoder with a number of zeros corrected by the FEC decoder.

According to another aspect of the invention, there is provided an apparatus including a decision circuit for receiving an input signal and providing an output signal representing logic ones and zeros in response to comparison of the input signal with a decision threshold; a FEC decoder configured to decode the output signal and to provide a feedback signal representative of a number of errors corrected by the FEC decoder for each of a plurality of sampling periods; and a decision threshold adjuster. The decision threshold adjuster is configured to add the number errors corrected by the FEC decoder for each of the sampling periods to determine a total number of errors corrected by the FEC decoder over the plurality of sampling periods, the total number of errors including a total number of ones corrected by the FEC decoder over the plurality of sampling periods and a total number of zeros corrected by the FEC decoder over the plurality of sampling periods. The decision threshold adjuster is further configured to adjust the decision threshold to balance the total number of ones with the total number of zeros when the total number of the errors exceeds a predetermined error threshold.

According to another aspect of the invention there is provided a method of adjusting a decision threshold in an optical signal receiver. The method includes identifying a number of ones and a number of zeros corrected by an FEC decoder over a time period; and modifying the decision threshold in response to the number of ones and zeros corrected by the FEC decoder over the time period.

According to another aspect of the invention there is provided an optical communication system including an optical signal transmitter including an encoder for encoding a binary data stream and a modulator for modulating the encoded binary data stream to produce an encoded optical signal; and an optical signal receiver for receiving the encoded optical signal. The optical signal receiver includes a demodulator for demodulating the encoded optical signal to provide an input signal; a decision circuit for receiving the input signal and providing an output signal representing logic ones and zeros in response to comparison of the input signal with a decision threshold; a FEC decoder configured to decode the output signal and to provide a feedback signal representative of a number of errors corrected by the FEC decoder; and a decision threshold adjuster. The decision threshold adjuster is configured to adjust the decision threshold in response to the feedback signal to balance a number of ones corrected by the FEC decoder with a number of zeros corrected by the FEC decoder.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An apparatus comprising:
   a decision circuit for receiving an input signal and providing an output signal representing logic ones and zeros in response to comparison of said input signal with a decision threshold;
   a FEC decoder configured to determine a polarity of said input signal and decode said output signal and to provide feedback representative of a number of errors corrected by said FEC decoder and indicating said polarity of said input signal; and
   a decision threshold adjuster configured to adjust said decision threshold in response to said feedback to balance a number of said ones corrected by said FEC decoder with a number of said zeros corrected by said FEC decoder, wherein said decision threshold adjuster is configured to adjust said decision threshold in a direction determined by a sign of said difference between said total number of said ones and said total number of zeros and said polarity of said input signal indicated by said feedback.

2. An apparatus according to claim 1, wherein said decision threshold adjuster is configured to adjust said decision threshold in proportion to a ratio of said number of said ones corrected by said FEC decoder to said number of said zeros corrected by said FEC decoder.

3. An apparatus according to claim 1, wherein said number of said ones corrected by said FEC decoder comprises a total number of said ones corrected by said FEC decoder over a plurality of sampling periods, and wherein said number of said zeros corrected by said FEC decoder comprises a total number of said zeros corrected by said FEC decoder over said plurality of sampling periods.

4. An apparatus according to claim 1, wherein said decision threshold adjuster is configured to add said number errors corrected by said FEC decoder over one or more sampling periods to determine a total number of said errors corrected by said FEC decoder over said one or more sampling periods, and wherein said decision threshold adjuster is configured to adjust said decision threshold when said total number of said errors exceeds a predetermined error threshold.

5. An apparatus according to claim 4, wherein said total number of said errors comprises a total number of said ones corrected by said FEC decoder over said one or more sampling periods and a total number of said zeros corrected by said FEC decoder over said one or more sampling periods, and wherein said decision threshold adjuster is configured to adjust said decision threshold to balance said total number of said ones with said total number of said zeros.

6. An apparatus according to claim 5, wherein said decision threshold adjuster is configured to adjust said decision threshold in proportion to a ratio of a difference between said total number of said ones and said total number of said zeros to said total number of errors.

7. An apparatus according to claim 6, wherein said decision threshold adjuster is configured to adjust said decision threshold in a direction determined by a sign of said difference between said total number of said corrected ones and said total number of corrected zeros.

8. An optical communication system comprising:
an optical signal transmitter comprising an encoder for encoding a binary data stream and a modulator for modulating said encoded binary data stream to produce an encoded optical signal;
an optical signal receiver for receiving said encoded optical signal, said optical signal receiver comprising:
  a demodulator for demodulating said encoded optical signal to provide an input signal;
  a decision circuit for receiving said input signal and providing an output signal representing logic ones and zeros in response to comparison of said input signal with a decision threshold;
  a FEC decoder configured to determine a polarity of said input signal and decode said output signal and to provide feedback representative of a number of errors corrected by said FEC decoder and indicating said polarity of said input signal; and
  a decision threshold adjuster configured to adjust said decision threshold in response to said feedback to balance a number of said ones corrected by said FEC decoder with a number of said zeros corrected by said FEC decoder,
wherein said decision threshold adjuster is configured to adjust said decision threshold in a direction determined by a sign of said difference between said number of said ones and said number of said zeros and said polarity of said input signal indicated by said feedback.

9. A system according to claim 8, wherein said decision threshold adjuster is configured to adjust said decision threshold in proportion to a ratio of a difference between said number of said ones and said number of said zeros to a total number of errors.

10. A system according to claim 9, wherein said decision threshold adjuster is configured to adjust said decision threshold in a direction determined by a sign of said difference between said number of said ones and said number of said zeros.

11. A system according to claim 8, wherein said number of said ones corrected by said FEC decoder comprises a total number of said ones corrected by said FEC decoder over a plurality of sampling periods, and wherein said number of said zeros corrected by said FEC decoder comprises a total number of said zeros corrected by said FEC decoder over said plurality of sampling periods.

12. A system according to claim 8, wherein said decision threshold adjuster is configured to add said number errors corrected by said FEC decoder over one or more sampling periods to determine a total number of said errors corrected by said FEC decoder over said one or more sampling periods, and wherein said decision threshold adjuster is configured to adjust said decision threshold when said total number of said errors exceeds a predetermined error threshold.

13. A system according to claim 12, wherein said total number of said errors comprises a total number of said ones corrected by said FEC decoder over said one or more sampling periods and a total number of said zeros corrected by said FEC decoder over said one or more sampling periods, and wherein said decision threshold adjuster is configured to adjust said decision threshold to balance said total number of said ones with said total number of said zeros.

14. A system according to claim 13, wherein said decision threshold adjuster is configured to adjust said decision threshold in proportion to a ratio of a difference between said total number of said ones and said total number of said zeros to the total number of errors.

* * * * *